United States Patent
Molaire et al.

(10) Patent No.: US 7,026,084 B2
(45) Date of Patent: Apr. 11, 2006

(54) COCRYSTALS CONTAINING HIGH-CHLORINE TITANYL PHTHALOCYANINE AND LOW CONCENTRATION OF TITANYL FLUOROPHTHALOCYANINE, AND ELECTROPHOTOGRAPHIC ELEMENT CONTAINING SAME

(75) Inventors: Michel F. Molaire, Rochester, NY (US); Jeanne E. Kaeding, Rochester, NY (US); Theodore Zubil, Rochester, NY (US); Jeffrey R. Murray, Palmyra, NY (US)

(73) Assignee: Eastman Kodak Company, Rochester, NY (US)

( * ) Notice: Subject to any disclaimer, the term of this patent is extended or adjusted under 35 U.S.C. 154(b) by 97 days.

(21) Appl. No.: 10/655,113

(22) Filed: Sep. 4, 2003

(65) Prior Publication Data

US 2004/0110075 A1   Jun. 10, 2004

Related U.S. Application Data (60) Provisional application No. 60/430,779, filed on Dec. 4, 2002, provisional application No. 60/430,219, filed on Dec. 4, 2002, provisional application No. 60/430,923, filed on Dec. 4, 2002, provisional application No. 60/430,777, filed on Dec. 4, 2002.

(51) Int. Cl.
*G03G 5/06* (2006.01)
*C09B 67/04* (2006.01)
*C09B 67/54* (2006.01)

(52) U.S. Cl. ................ 430/78; 430/135; 540/136; 540/141

(58) Field of Classification Search ................ 430/78, 430/135; 540/136, 141
See application file for complete search history.

(56) References Cited

U.S. PATENT DOCUMENTS

| | | | |
|---|---|---|---|
| 3,589,924 A | 6/1971 | Giambalvo et al. | 106/288 Q |
| 4,555,467 A | 11/1985 | Hasegawa et al. | 430/110 |
| 4,701,396 A | 10/1987 | Hung et al. | 430/58 |
| 4,785,999 A | 11/1988 | Takijiri | 241/26 |
| 4,882,427 A | 11/1989 | Enokida et al. | 540/141 |
| 4,994,566 A | 2/1991 | Mimura et al. | 540/141 |
| 5,008,173 A | 4/1991 | Mimura et al. | 430/78 |
| 5,039,586 A | 8/1991 | Itami et al. | 430/78 |
| 5,055,368 A | 10/1991 | Nguyen et al. | 430/78 |
| 5,059,355 A | 10/1991 | Ono et al. | 252/584 |
| 5,112,711 A | 5/1992 | Nguyen et al. | 430/58 |
| 5,132,197 A | 7/1992 | Iuchi et al. | 430/76 |
| 5,166,339 A | 11/1992 | Duff et al. | 540/141 |
| 5,194,354 A | 3/1993 | Takai et al. | 430/58 |
| 5,206,359 A | 4/1993 | Mayo et al. | 540/141 |
| 5,238,764 A | 8/1993 | Molaire et al. | 430/58 |
| 5,238,766 A | 8/1993 | Molaire et al. | 430/78 |
| 5,523,189 A | 6/1996 | Molaire | 430/58 |
| 5,614,342 A | 3/1997 | Molaire et al. | 430/78 |
| 5,629,418 A | 5/1997 | Molaire et al. | 540/141 |
| 5,766,810 A | 6/1998 | Molaire et al. | 430/78 |
| 5,773,181 A | 6/1998 | Molaire et al. | 430/78 |
| 5,972,551 A * | 10/1999 | Miyauchi et al. | 430/78 |

FOREIGN PATENT DOCUMENTS

| | | |
|---|---|---|
| EP | 0325748 A | 8/1989 |
| EP | 03010256 | 1/1991 |
| EP | 0 405 420 B1 | 1/1999 |
| JP | 1291256 | 11/1989 |
| JP | 2183262 A | 7/1990 |

* cited by examiner

*Primary Examiner*—John L. Goodrow
(74) *Attorney, Agent, or Firm*—Carl F. Ruoff (57) ABSTRACT

In a process for forming an amorphous TiOPc/TiOFPc pigment mixture containing a low concentration of TiOFPc, a mixture containing phthalonitrile and titanium tetrachloride is subjected to reaction conditions effective to form lightly chlorine-substituted crude crystalline Cl—TiOPc. The lightly chlorine-substituted crude crystalline Cl—TiOPc is combined with crude crystalline TiOFPc in a weight ratio from about 75:25 Cl—TiOPc:TiOFPc to about 99.5:0.5 Cl—TiOPc:TiOFPC to form a crude crystalline pigment mixture, which is treated under conditions effective to form a substantially amorphous pigment mixture of Cl—TiOPc and TiOFPc. The substantially amorphous mixture can subsequently be converted to a nanocrystalline Cl—TiOPc/TiOFPc pigment composition containing a low concentration of TiOFPc.

23 Claims, 6 Drawing Sheets

COCRYSTALS CONTAINING HIGH-CHLORINE TITANYL PHTHALOCYANINE AND LOW CONCENTRATION OF TITANYL FLUOROPHTHALOCYANINE, AND ELECTROPHOTOGRAPHIC ELEMENT CONTAINING SAME

CROSS-REFERENCE TO RELATED APPLICATIONS

Reference is made to the following co-pending, commonly-assigned applications, the disclosures of which are incorporated herein by reference:

U.S. Provisional Patent Application Ser. No. 60/430,779, filed Dec. 4, 2002, in the names of Molaire, et al., entitled SELF-DISPERSING TITANYL PHTHALOCYANINE PIGMENT COMPOSITIONS AND ELECTROPHOTOGRAPHIC CHARGE GENERATION LAYERS CONTAINING SAME;

U.S. Provisional Patent Application Ser. No. 60/430,219, filed Dec. 2, 2002, in the name of Molaire, entitled UNIFORM COCRYSTALS OF TITANYL FLUOROPHTHALOCYANINE AND TITANYL PHTHALOCYANINE FORMED IN TRICHLOROETHANE, AND CHARGE GENERATING LAYER CONTAINING SAME;

U.S. Provisional Patent Application Ser. No. 60/430,923, filed Dec. 4, 2002, in the names of Molaire, et al., entitled TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME;

U.S. Provisional Patent Application Ser. No. 60/430,777, filed Dec. 4, 2002, in the names of Molaire, et al., entitled PROCESS FOR FORMING COCRYSTALS CONTAINING CHLORINE-FREE TITANYL PHTHALOCYANINES AND LOW CONCENTRATION OF TITANYL FLUOROPHTHALOCYANINE USING ORGANIC MILLING AID.

FIELD OF THE INVENTION

The present invention relates to electrophotographic elements and related materials. More particularly, the invention relates to a process for amorphizing highly crystalline mixtures of titanyl phthalocyanine (TiOPc) and titanyl tetrafluorophthalocyanine (TiOFPc) pigments containing a high concentration of TiOPc and converting the amorphous mixtures to nanoparticulate cocrystalline compositions.

BACKGROUND OF THE INVENTION

In electrophotography, an image comprising a pattern of electrostatic potential, also referred to as an electrostatic latent image, is formed on a surface of an electrophotographic element comprising at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials that have been employed in electrophotographic elements are phthalocyanine pigments such as titanyl phthalocyanine and titanyl tetrafluorophthalocyanines. Electrophotographic recording elements containing such pigments as charge-generation materials are useful in electrophotographic laser beam printers because of their capability for providing good photosensitivity in the near infrared region of the electromagnetic spectrum, that is, in the range of 700–900 nm.

Flocculation of organic pigment dispersions has been a recognized problem, especially in the paint and coating industry, for some time. For example, U.S. Pat. No. 3,589,924, in the names of Giambalvo, et al., describes improved non-crystallizing, non-flocculating phthalocyanine pigment compositions formed by mixing 60–95% of a crystallization-or flocculation-susceptible phthalocyanine pigment with about 5–40% of a sulfonated phthalimidomethyl phthalocyanine derivative. The mixture is prepared by the usual methods, e.g., acid pasting or salt grinding, for converting the phthalocyanine materials to pigmentary size. However, techniques that are designed primarily to provide suitable pigments for paints and industrial coatings may not yield materials of sufficient purity or the appropriate crystallinity characteristics to meet the stringent requirements of electrophotographic applications, where high purity is very important for ensuring reliable performance. The crystalline form of the final pigment also has a profound influence on the performance of an electrophotographic element containing it.

In a photoconductive layer produced from a liquid coating composition that includes the titanyl phthalocyanine pigment and a solvent solution of polymeric binder, it is necessary that the titanyl phthalocyanine pigment be in a highly photoconductive form, either crystalline or amorphous, and in a sufficiently stable dispersion to permit its application as a very thin layer having high electrophotographic speed in the near infrared region.

A variety of methods have been used to produce suitable forms of titanyl phthalocyanine having differing crystallographic characteristics. U.S. Pat. No. 5,166,339 in the names of Duff, et al., presents a table of polymorphs of unsubstituted titanyl phthalocyanine in which materials bearing multiple designations are grouped as four types. Many phthalocyanine pigments are discussed in P. M. Borsenberger and D. S. Weiss, *Organic Photoreceptors for Imaging Systems*, Marcel Dekker, Inc., New York, pp. 338–391.

In one type of preparation, commonly referred to as "acid-pasting", crude titanyl phthalocyanine is dissolved in an acid solution, which is then diluted with a non-solvent to precipitate the titanyl phthalocyanine product. In another type of procedure, the crude titanyl phthalocyanine is milled, generally with particular milling media. Additionally, some preparations include a combination of techniques or modify a previously prepared titanyl phthalocyanine.

U.S. Pat. No. 5,132,197 in the names of Iuchi, et al., teaches a method in which titanyl phthalocyanine is acid pasted, treated with methanol, and milled with ether, monoterpene hydrocarbon, or liquid paraffin to produce a titanyl phthalocyanine having main peaks of the Bragg angle 2Θ with respect to X-rays of Cu Kα at 9.0°, 14.2°, 23.9°, and 27.1° (all +/−0.2°).

U.S. Pat. No. 5,206,359 in the names of Mayo, et al., teaches a process in which titanyl phthalocyanine produced by acid pasting is converted to type IV titanyl phthalocyanine from Type X by treatment with halobenzene.

U.S. Pat. No. 5,059,355 in the names of Ono, et al., teaches a process in which titanyl phthalocyanine is shaken with glass beads, producing an amorphous material having no substantial peaks detectable by X-ray diffraction. The amorphous material is stirred, with heating, in water and ortho-dichlorobenzene; methanol is added after cooling. A crystalline material having a distinct peak at 27.3° is produced.

U.S. Pat. No. 4,882,427 in the names of Enokida, et al., teaches a material having noncrystalline titanyl phthalocyanine and pseudo-non-crystalline titanyl phthalocyanine. The pseudo-noncrystalline material can be prepared by acid pasting or acid slurrying. The noncrystalline titanyl phthalocyanine can be prepared by acid pasting or acid slurrying followed by dry or wet milling, or by mechanical milling for a long time without chemical treatment.

U.S. Pat. No. 5,194,354 in the names of Takai, et al., teaches that amorphous titanyl phthalocyanine prepared by dry pulverization or acid pasting can be converted, by stirring in methanol, to a low crystalline titanyl phthalocyanine having strong peaks of the Bragg angle 2Θ with respect to X-rays of Cu Kα at 7.2°, 14.2°, 24.0°, and 27.2° (all +/−0.2°). It is stated that the low crystalline material can be treated with various organic solvents to produce crystalline materials: methyl cellosolve or ethylene glycol for material having strong peaks at 7.4°, 10.9°, and 17.9°; propylene glycol, 1,3-butanediol, or glycerine for material having strong peaks at 7.6°, 9.7°, 12.7°, 16.2°, and 26.4°; and aqueous mannitol solution for material having strong peaks at 8.5° and 10.2° (all peaks +/−0.2°).

U.S. Pat. Nos. 4,994,566 and 5,008,173 both in the names of Mimura, et al., teach a process in which non-crystalline particles produced by acid pasting or slurrying, followed by mechanical grinding or sublimation, are treated with tetrahydrofuran to produce a titanyl phthalocyanine having infrared absorption peaks at 1332, 1074, 962, and 783 cm$^{-1}$.

U.S. Pat. No. 5,039,586 in the name of Itami, teaches acid pasting, followed by milling in aromatic or haloaromatic solvent, with or without additional water or other solvents such as alcohols or ethers, at 20–100° C. In an example, crude titanyl phthalocyanine is milled with α-chloronaphthalene or ortho-dichlorobenzene as milling medium, followed by washing with acetone and methanol. The titanyl phthalocyanine produced has a first maximum intensity peak of the Bragg angle 2Θ with respect to X-rays of Cu Kα at a wavelength of 1.541 Å at 27.3°+/−2°, and a second maximum intensity peak at 6.8°+/−2°. This was contrasted with another titanyl phthalocyanine that is similarly milled, but not acid pasted. This material has a maximum peak at 27.3°+/−0.2° and a second maximum intensity peak at 7.5°+/−0.2°.

U.S. Pat. No. 5,055,368 in the names of Nguyen, et al., teaches a "salt-milling" procedure in which crude titanyl phthalocyanine is milled, first under moderate shearing conditions with milling media comprising inorganic salt and non-conducting particles. The milling is then continued at higher shear and temperatures up to 50° C., until the pigment undergoes a perceptible color change. Solvent is substantially absent during the milling steps.

U.S. Pat. No. 4,701,396 in the names of Hung, et al., teaches near infrared sensitive photoconductive elements made from fluorine-substituted titanylphthalocyanine pigments. While phthalocyanines having only fluorine substituents, and those being equal in number on each aromatic ring, are the preferred pigments of the invention described in that patent, various non-uniformly substituted phthalocyanines are taught.

U.S. Pat. No. 5,112,711 in the names of Nguyen, et al., teaches an electrophotographic element having a physical mixture of titanyl phthalocyanine crystals and titanyl fluorophthalocyanine crystals. The element provides a synergistic increase in photosensitivity in comparison to an expected additive combination of titanyl phthalocyanine and titanyl fluorophthalocyanine. Similar elements having physical mixtures combining titanyl phthalocyanine and chloro- or bromo-substituted titanyl phthalocyanine crystals produce results in which the photosensitivity is close to that of the least sensitive of the two phthalocyanines used.

U.S. Pat. Nos. 5,238,764 and 5,238,766, both in the names of Molaire, et al., teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or tetrahydrofuran, which has a gamma$_c$ hydrogen bonding parameter value greater than 9.0. These patents further teach that this reduction in sensitivity can be prevented by first contacting the titanyl fluorophthalocyanine with a material having a gamma$_c$ hydrogen bonding parameter of less than 8.0.

Molaire et al., in U.S. Pat. No. 5,629,418, discloses a method for preparing titanyl fluorophthalocyanine that comprises the steps of: dissolving titanyl fluorophthalocyanine in acid to form a solution; admixing the solution and water to precipitate out amorphous titanyl fluorophthalocyanine; washing the amorphous titanyl fluorophthalocyanine until substantially all of the acid is removed and contacting it with an organic solvent, which results in the conversion of the amorphous material to high crystallinity titanyl fluorophthalocyanine, the amorphous titanyl fluorophthalocyanine having been maintained in contact with water continuously from its precipitation to its conversion to a crystalline form.

The particle size distribution and stability of charge generation dispersions are very important for providing uniform charge generation layer in order to control generation of "breakdown spots" and minimize the granularity of prints. In U.S. Pat. Nos. 5,614,342 and 5,766,810 both in the names of Molaire and Kaeding, disclose a method for preparing cocrystals of titanyl fluorophthalocyanine and unsubstituted titanyl phthalocyanine that comprises the steps of: admixing crude titanyl phthalocyanine and crude titanyl fluorophthalocyanine to provide an amorphous pigment mixture, as determined by X-ray crystallography using X-radiation characteristic of Cu Kα at a wavelength of 1.541 Å of the Bragg angle 2Θ; contacting the amorphous pigment mixture with an organic solvent having a gamma$_c$ hydrogen bonding parameter of less than 8:0; and, prior to contacting, substantially excluding the amorphous pigment mixture from contact with an organic solvent having a gamma$_c$ hydrogen bonding parameter greater than 9.0. The amorphization step must be substantially complete so as to break the large primary particles of the starting crude pigments and thereby lower the average particle size of the final cocrystalline mixture. Substantially complete amorphization of the crude pigments is also necessary to prevent degradation of the dark decay characteristics of the final cocrystal; small amounts of crude pigments having inherently high dark decay that are not amorphized would not be affected by the subsequent solvent treatment and therefore would retain their high dark decay characteristics, causing degradation of the dark decay property of the final cocrystalline product.

Molaire, et al., in U.S. Pat. No. 5,523,189, discloses an electrophotographic element comprising a charge generation layer that includes a binder in which is dispersed a physical mixture of a high speed titanyl fluorophthalocyanine having a first intensity peak with respect to X-rays characteristic of Cu Kα at a wavelength of 1.541 Å of the Bragg angle 2Θ at 27°±0.2°, and a second intensity peak at 7.3°±0.2°, the second peak having an intensity relative to the first peak of less than 60 percent; and a low speed titanyl fluorophthalocyanine having a first intensity peak with respect to X-rays characteristic of Cu Kα at a wavelength of 1.541 Å of the Bragg angle 2 Θ at 6.7°±0.2°, and a second intensity peak at 23°±0.2°, the second peak having an intensity relative to the first peak of less than 50 percent.

Molaire, et al., in U.S. Pat. No. 5,773,181, discloses a method for preparing a phthalocyanine composition comprising the steps of: synthesizing a crystalline product comprising a mixture of five different unsubstituted or fluoro-substituted phthalocyanines, wherein a central M moiety bonded to the four inner nitrogen atoms of the phthalocyanine nuclei represents a pair of hydrogen atoms or a covalent or coordinate bonded moiety, including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb, with M preferably representing Ti=O; increasing the amorphous character of the mixture of phthalocyanines as determined by X-ray crystallography using X-radiation characteristic of Cu Kα at a wavelength of 1.541 Å of the Bragg angle 2Θ to provide an amorphous pigment mixture; contacting the amorphous pigment mixture with organic solvent having a $\gamma_c$ hydrogen bonding parameter of less than 8.0; and prior to the contacting, substantially excluding the amorphous pigment mixture from contact with organic solvent having a $\gamma_c$ hydrogen bonding parameter greater than 9.0.

The procedures for the preparation of titanyl phthalocyanine pigments described in the foregoing patents, all of whose disclosures are incorporated herein by reference, suffer from various deficiencies and disadvantages. For example, the use of acid presents a shortcoming for both environmental and safety concerns, particularly in commercial scale procedures. Also, salt milling avoids the use of acid but requires extensive washing of the milled material to remove salts, which can otherwise cause high dark decay in a photoconductor.

Procedures that first contact the titanyl fluorophthalocyanine with a solvent such as methanol or tetrahydrofuran that has a $\gamma_c$ hydrogen bonding parameter value greater than 9.0 cause a significant reduction in near infrared sensitivity. The preparation of titanyl fluorophthalocyanine having good photogeneration characteristics is expensive. It would be desirable to be able to produce a crystalline titanyl phthalocyanine composition that has good photogeneration characteristics when used in an electrophotographic element but is less expensive than titanyl fluorophthalocyanine. A suitable procedure would avoid deleterious contact with high $\gamma_c$ hydrogen bonding parameter solvents and also not require the use of acid or of salt milling media.

SUMMARY OF THE INVENTION

A process for forming an amorphous TiOPc/TiOFPc pigment mixture containing a low concentration of TiOFPc comprises: subjecting a mixture comprising phthalonitrile and titanium tetrachloride to reaction conditions effective to form lightly chlorine-substituted crude crystalline Cl—TiOPc, combining the lightly chlorine-substituted crude crystalline Cl—TiOPc with crude crystalline TiOFPc in a weight ratio from about 70:30 Cl—TiOPc:TiOFPc to about 99.5:0.5 Cl—TiOPc:TiOFPC to form a crude crystalline pigment mixture, and treating the crude crystalline pigment mixture under conditions effective to form a substantially amorphous pigment mixture of Cl—TiOPc and TiOFPc.

Further, in accordance with the present invention, a nanoparticulate Cl—TiOPc/TiOFPc pigment composition containing a low concentration of TiOFPc is obtained by forming a slurry in an organic solvent of the substantially amorphous pigment mixture of Cl—TiOPc and TiOFPc, and wet milling the slurry to form the nanoparticulate composition.

BRIEF DESCRIPTION OF THE DRAWINGS

FIGS. 1–6 are X-ray diffraction spectra showing peaks of the Bragg angle 2Θ with respect to X-rays of Cu Kα at a wavelength of 1.541 Å for mixtures of TiOPc and TiOFPc for comparative examples and examples of the invention, as follows:

Preferably, the Cl—TiOPc in the nanoparticulate cocrystalline composition contains about 0.5 wt. % to about 2.0 wt. % chlorine.

DETAILED DESCRIPTION OF THE INVENTION

The present inventors have discovered reactions conditions by which a relatively small amount of ring-substituted chlorine can be introduced into a TiOPc pigment, resulting in a lightly chlorinated TiOPc, designated hereinafter as "Cl—TiOPc". The small amount of ring-substituted chlorine introduced into TiOPc is enough to enhance its ease of grindability to form substantially amorphous Cl—TiOPc/TiOFPc pigment, even at concentrations of TiOFPc as low as about 0.5 wt. %.

The lightly chlorinated Cl—TiOPc is formed from a mixture comprising titanium tetrachloride and phthalonitrile, wherein the molar ratio of titanium tetrachloride to phthalonitrile is preferably about 0.25:1 to about 1:1, more preferably, about 0.25:1 to about 0.5:1. The mixture can further include an organic solvent, preferably a chlorinated organic solvent such as 1-chloronaphthalene. The reaction is preferably carried out at elevated temperatures, preferably about 150° C. to about 250° C., more preferably, about 190° C. to about 215° C.

In the process of the present invention, it is important that the amorphization of the pigments in the first step be substantially complete to ensure the proper formation of the subsequently formed cocrystal. In particular, substantially complete amorphization of the initial pigment mixture breaks down the large particle size of the crude pigments and yields a cocrystal final product of desirably small particle size. In addition, because the original crystalline forms of the crude pigments, which frequently exhibit inherent dark decay characteristics, are resistant to solvent treatment following milling, their residual presence in the final cocrystal product will likely exert an undesirable effect on its dark decay performance.

Unsubstituted titanyl phthalocyanine, abbreviated throughout this application as "TiOPc", has the following structural formula:

Titanyl fluorophthalocyanines, abbreviated herein as "TiFOPc", have the following structural formula:

wherein each of k, l, m, and n is independently an integer from 1 to 4. In a particular embodiment of the invention, the crystalline titanyl fluorophthalocyanine is a mixture comprising titanyl 2,9,16,23-tetrafluorophthalocyanine, titanyl 2,9,16-trifluorophthalocyanine, titanyl 2-fluorophthalocyanine, titanyl 2,9-difluorophthalocyanine, and titanyl 2,16-difluorophthalocyanine. The composition of the mixture and their electrophotographic properties can be manipulated through varying the weight ratio of the fluorophthalocyanines. The characteristics of the phthalocyanines combined to form the crude mixture are determined by the desired photogeneration characteristics of the final product.

Crude titanyl phthalocyanine and titanyl fluorophthalocyanine can be synthesized by a number of well-known procedures, for example, those described in the previously discussed U.S. Pat. Nos. 4,701,396 and 5,614,342. As synthesized, titanyl phthalocyanine pigments normally have a particle size that is too large for them to be effectively used in electrophotographic applications. In this condition, they are known in the art as "crude" pigments. Such crude pigments normally have a particle size in excess of 10 micrometers, often a particle size of at least 50 micrometers, and in some cases, at least 1 millimeter. The term "particle size" is used herein to refer to the largest dimension of an individual particle and the median value of the same parameter for the particles of a particulate. Particle size can be readily determined from electron photomicrographs using techniques well known to those skilled in the art.

Mixtures of crystalline crude pigments are treated under conditions to render them amorphous. The crystallographic characteristics discussed herein, i.e., amorphousness and crystallinity, are based upon X-ray diffraction spectra at the Bragg angle 2Θ using Cu Kα X-radiation at a wavelength of 1.541 Å and are ±0.2.degree, unless otherwise indicated. Suitable X-ray diffraction techniques are described, for example, in *Engineering Solids*, T. S. Hutchinson and D. C. Baird, John Wiley and Sons, Inc., 1963, and *X-ray Diffraction Procedures for Polycrystalline and Amorphous Materials*, 2nd Ed., John Wiley and Sons, Inc., 1974.

Dry milling is the preferred procedure for rendering the crude pigment mixture amorphous. In dry milling, the crude pigment mixture is mechanically ground in the dry state under shear conditions that break up particle agglomerates, reduce the particle size, and render the mixture less crystalline, i.e., more amorphous. Preferably, dry milling is continued until the pigment mixture becomes substantially or fully amorphous. The term "fully amorphous", as used herein, refers to a crystalline/amorphous state in which the well defined peaks of the crude phthalocyanine are replaced by a very high baseline response modulated by a few very broad, 5–10 degree or wider peaks.

The dry milling procedure is carried out in the substantial absence of any solvent or polymeric binder. Milling apparatus capable of providing the necessary shear are well known and include, for example, conventional ball mills, roll mills, paint shakers, vibrating mills, and the apparatus described in U.S. Pat. Nos. 4,555,467 and 4,785,999. The shear employed is varied, as is well known to those skilled in the art, depending upon such factors as the type of milling apparatus, milling aids such as steel balls, and the crude pigment mixture used. The energy applied in the first milling stage generally does not exceed about 5 watts, and is typically from about 3 to 5 watts. Enough energy is applied to convert the crude pigment mixture to a low crystallinity pigment mixture.

The milling apparatus used during the dry milling stage may or may not require the use of particulate milling aids that are added to the pigment particles to increase shear and decrease milling time. Particulate milling aids suitable for use in the claimed invention are materials that can be easily removed from the milled pigment mixture. Examples of preferred particulate milling aids are steel beads and ceramic, glass, and zirconia media. These aids typically are available in sizes from about 0.5 mm to about 5 mm in diameter. Typically, the concentration of the pigment mixture during milling is from about 2 to 25 weight percent relative to the total weight of the pigment mixture and the milling media. The dry milling time will vary greatly depending upon a number of factors such as relative proportions of pigment mixture and milling aid and the specific milling equipment used. Generally, a suitable time for the dry milling stage may be as much as 240 hours, with typical times being in the range of from about 0.5 to 120 hours.

Milling tends to result in the liberation of heat, which would raise the temperature of the milled composition. It is desirable that the milling apparatus include temperature regulating means to help maintain the temperature below the decomposition temperature of the phthalocyanine pigments, preferably in the range of about 0° C. to about 150° C., more preferably about 40° C. to about 100° C.

In a particular embodiment of the invention, the milling is performed in a Sweco Vibro Energy grinding mill manufactured by Sweco, Inc., of Florence, Ky., stainless steel beads being added to the pigment mixture as a milling media. The pigment mixture is milled for a time period of from 12 to 96 hours at temperatures within the range of 25° C. to 60° C.

The amorphous pigment mixture is converted to a cocrystalline form by contacting with an organic solvent having a gamma, hydrogen bonding parameter value less than 9.0, or preferably less than 8.0, before the mixture comes into contact with any organic solvent having a gamma, hydrogen bonding parameter value greater than 9.0. The conversion can be carried out by wet milling the amorphous pigment in the presence of dichloromethane. Particulate milling aids such as steel beads can be used in the wet milling procedure. X-ray diffraction analysis of the pigment following removal of the milling aid and solvent confirms the cocrystalline nature of the TiOPc/TiOFPc pigment mixture.

Preparation 1: Preparation of Crude, Substantially Chlorine-Free Titanyl Phthalocyanine (TiOPc)

Phthalonitrile (1280 g), benzamide (1512.5 g), xylene (1250 ml), and pentanol (1052 g) were added in that order into a 12-liter 3-necked round-bottomed flask equipped with a temperature probe and temperature controller, a condenser, and a paddle stirrer. After the stirrer was started, titanium (IV) butoxide (838 g), and xylene (1000 ml) were added. The reaction mixture was heated to reflux (144° C.) for six hours, then cooled to 85° C., and filtered through a medium frit sintered glass funnel. The pigment was rinsed first with 4×500 ml portions of toluene and then with 4×500 ml portions of hot dimethylformamide. After an overnight soak in dimethylformamide, the mixture was heated at reflux in that solvent for one hour. The product was collected and washed with methanol and acetone, then dried at 70–80° C. overnight. Neutron activation indicated 8.6+/−0.02 wt % titanium and less than 0.01 wt % chlorine.

Preparation 2: Preparation of Crude Titanyl Tetrafluorophthalocyanine (TiOFPc)

Crude titanyl tetrafluorophthalocyanine was prepared as described in Preparation 2 of U.S. Pat. No. 5,614,342.

Preparation 3: Preparation of Crude Lightly-Chlorine Substituted Titanyl Phthalocyanine (Cl—TiOPC)Using 0.25 equivalents TiCl$_4$ at 215° C.

Phthalonitrile (2302 g, 17.99 mole) and titanium tetrachloride (940.5 g, 4.95 mole) were suspended in 1-chloronaphthalene (12.2 l), heated to 218° C., and maintained at that temperature for 2 hours. The reaction mixture was then cooled over 3 hr to 95° C. before filtering through a medium frit sintered glass funnel. The collected solid was rinsed with 500 g of 1-chloronaphthalene, then with 6 liters of acetone, and finally with 6 liters of methanol. The washed solid was placed into a 22-l flask, and water was added. The following day, the mixture was boiled for 5–5.5 hr to hydrolyze the solid, which was collected by filtration, and rinsed with water. The solid was treated with boiling water and collected by filtration three more times, until the filtrate tested pH neutral. The product was then dried in an air oven at 50° C. for several days. Neutron activation indicated 7.7+/−0.02 wt. % titanium and 0.8 wt. % chlorine. ps Preparation 4: Preparation of Crude Lightly-Chlorine Substituted Titanyl Phthalocyanine (Cl—TiOPC) Using 0.5 equivalents TiCl$_4$ at 215° C.

Preparation 3 was followed, except that 0.5 equivalents of titanium tetrachloride was used. Neutron activation indicated 7.9+/−0.02 wt % titanium and 1.2 wt % chlorine.

Preparation 5: Preparation of Crude Lightly-Chlorine Substituted Titanyl Phthalocyanine (Cl—TiOPC) Using 0.5 equivalents TiCl$_4$ at 190° C.

Preparation 4 was followed, except that the reaction temperature was 190° C. Neutron activation indicated 9.7+/−0.02 wt % titanium and 1.5 wt % chlorine.

COMPARATIVE EXAMPLE 1

Preparation of 90:10 TiOPc:TiOFPc Using Substantially Chlorine-Free TiOPc

Figure 1:
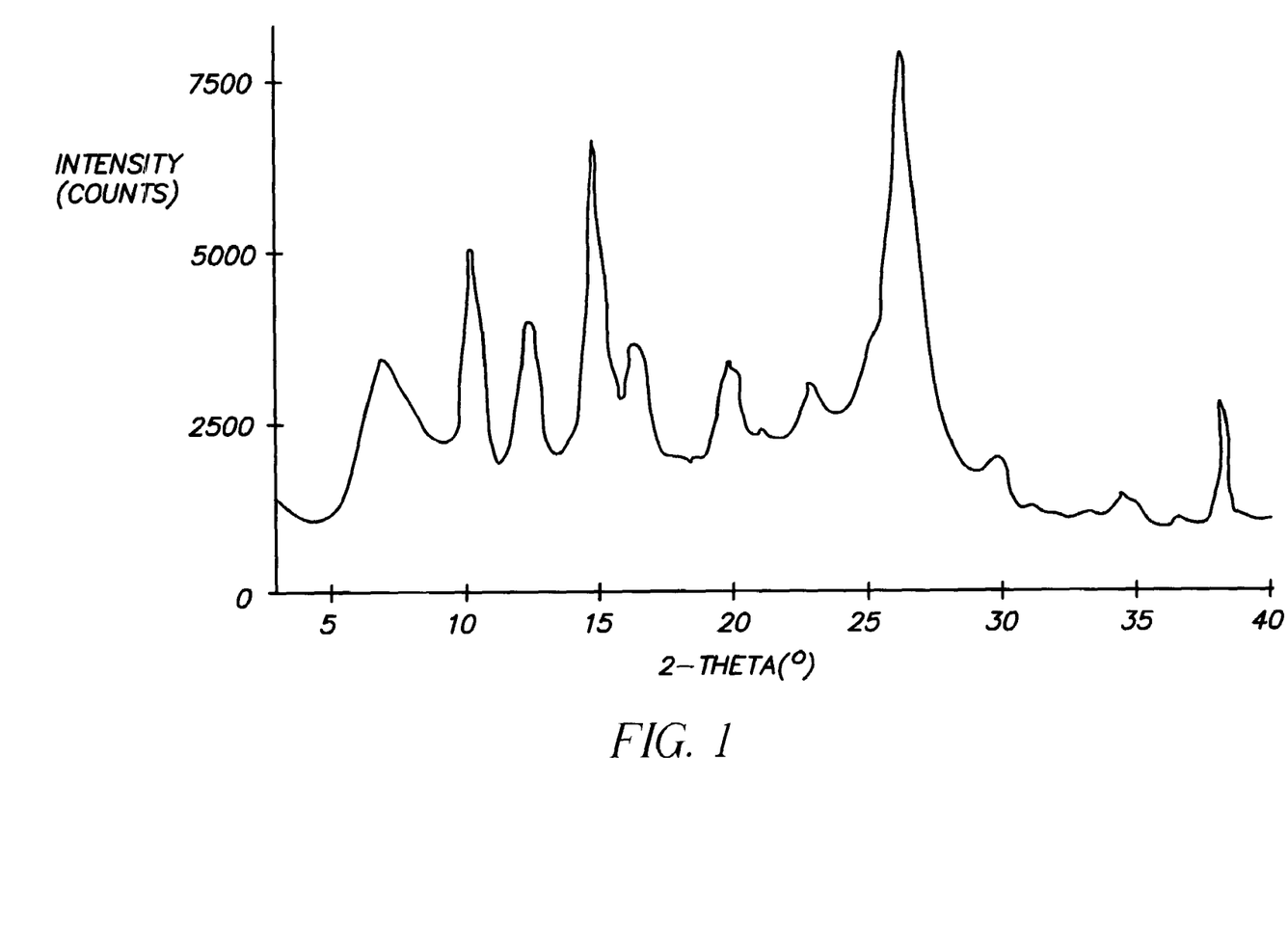
FIG. 1 shows an X-ray diffraction spectra of a highly crystalline 90:10 TiOPc:TiOFPc composition of Comparative Example 1.

A 16-oz wide-mouth glass jar was charged with 900 g of 3 mil stainless steel beads, 6.65 g of the crude, substantially chlorine-free titanyl phthalocyanine of Preparation 1, and 0.75 g of the titanyl tetrafluorophthalocyanine of Preparation 2 and placed on Sweco mill for three days. Then 100 ml of water was introduced, and the pigment was milled for an additional 24-hour period. The pigment was then separated from the beads and the water, dried, and analyzed by X-ray for amorphicity. The resulting diffraction spectrum, shown in FIG. 1, is typical of a highly crystalline pigment.

EXAMPLE 1

Preparation of 90:10 Cl—TiOPc:TiOFPc

Figure 2:
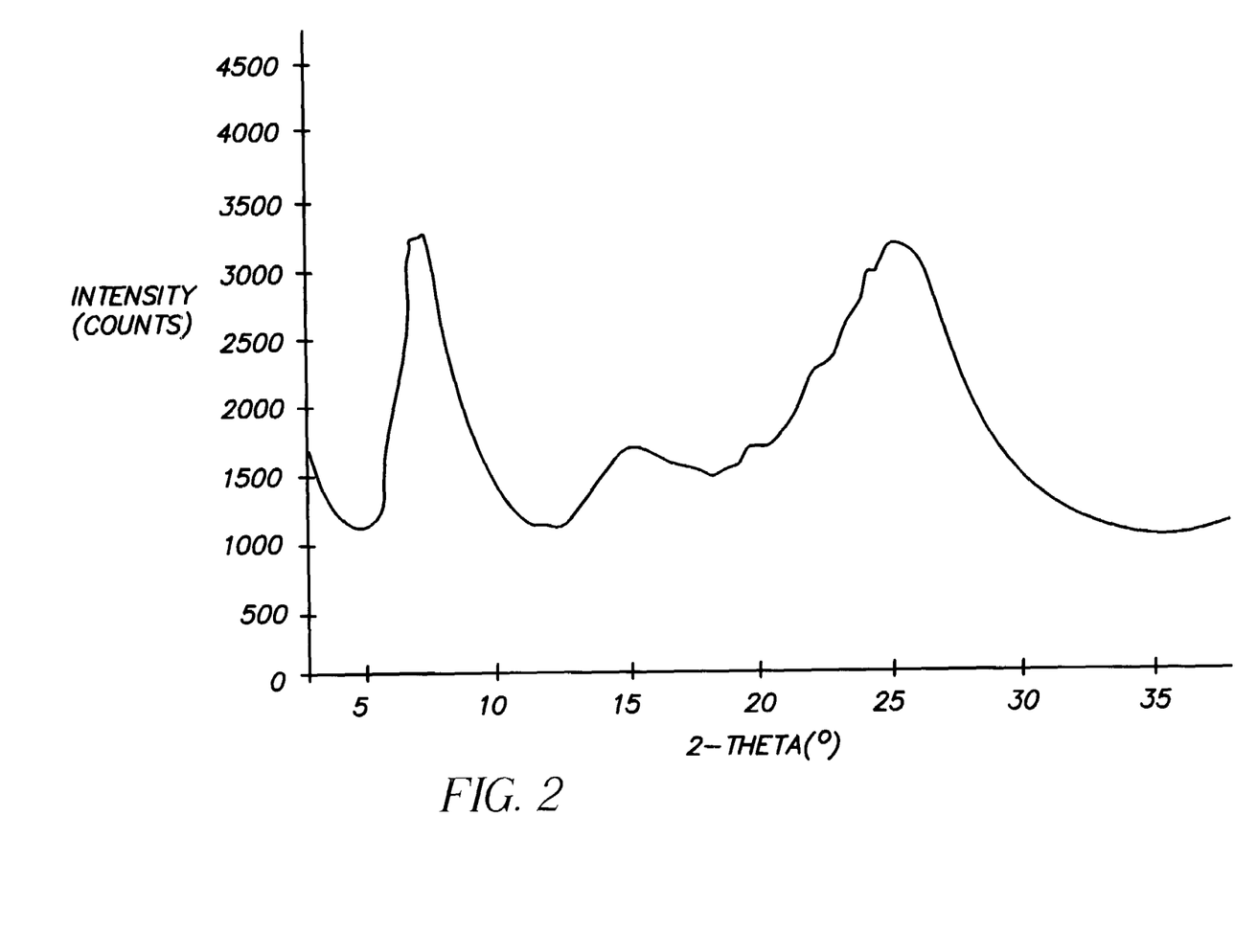
FIG. 2 shows an amorphous 90:10 Cl—TiOPc:TiOFPc composition of Example 1.

A 1-gallon wide-mouth glass jar was charged with 9 kg of 3 mm stainless steel balls, 67.5 g Cl—TiOPc made by Preparation 3 and having a chlorine content of 0.8 wt. %, and 7.5 g TiOFPc made by Preparation 2. The jar was put on a roller mill at 85 rpm, and milling was carried out for 120 hours, at which time a small sample was removed and treated in water as described in Comparative Example 1. The water-treated sample was dried and sent for x-ray analysis, the resulting spectrum being shown in FIG. 2. By comparison with the spectrum of FIG. 1, the X-ray diffraction spectrum in FIG. 2 shows that the mixture prepared from Cl—TiOPc containing a small amount of chlorinated pigment, was fully amorphized.

Figure 3:
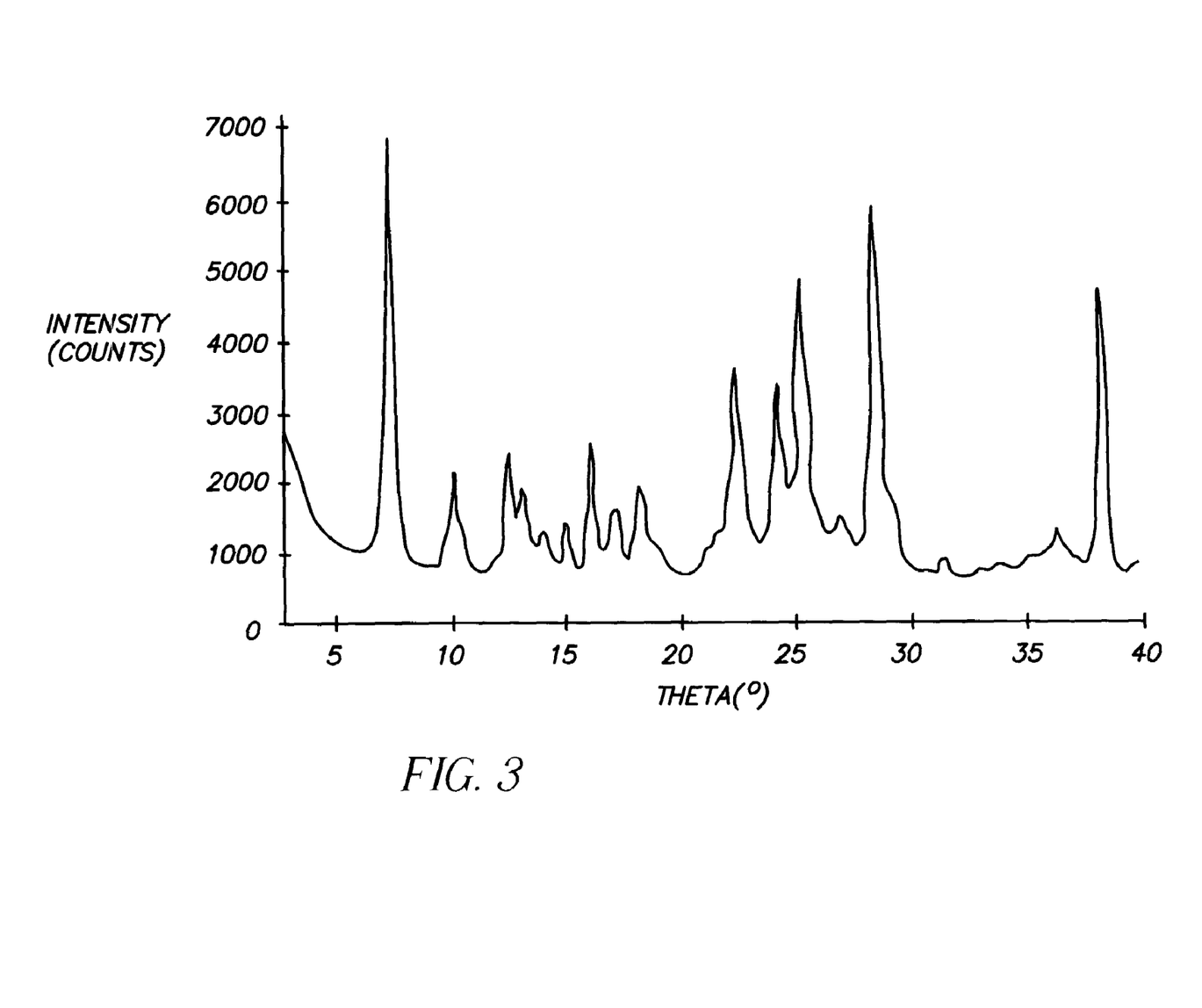
FIG. 3 shows a cocrystalline 90:10 Cl—TiOPc:TiOFPc composition of Example 1.

To the bulk of the sample in the jar was added 1500 ml of dichloromethane. The mixture was further milled for 24 hours, and the beads were separated from the dichloromethane pigment slurry. The pigment was collected by filtration, dried, and subjected to X-ray analysis. Its spectrum, shown in FIG. 3, depicts a typical pattern for a cocrystalline TiOPc/TiOFPc mixture, similar to that in FIG. 1.

EXAMPLE 2

Second Preparation of 90:10 Cl—TiOPc:TiOFPc

Figure 4:
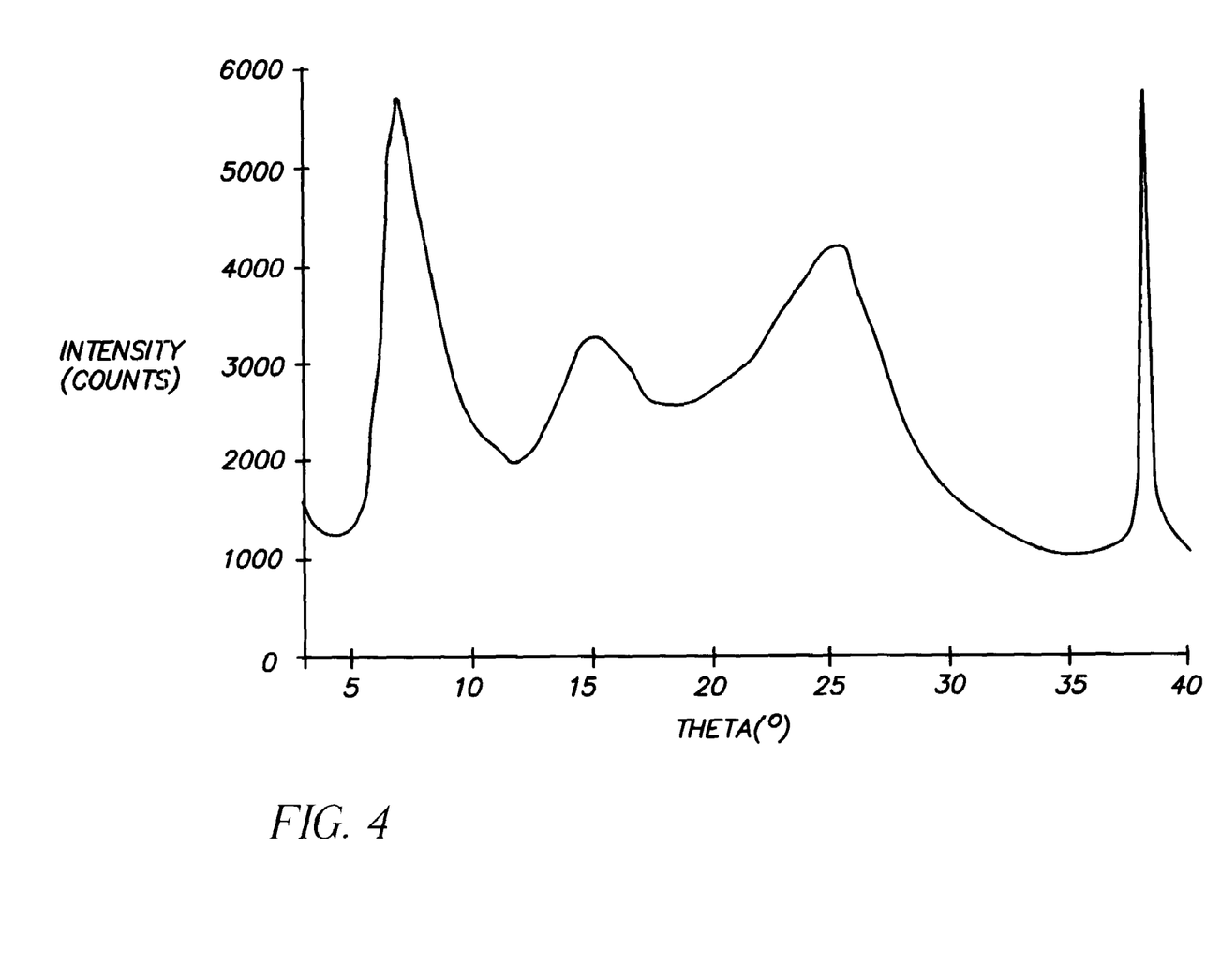
FIG. 4 shows an amorphous 90:10 Cl—TiOPc:TiOFPc composition of Example 2.

The procedure of Example 1 was followed, except that the Cl—TiOPc made by Preparation 4 and having a chlorine content of 1.2 wt % was used. The X-ray diffraction spectrum of the intermediate amorphous pigment obtained is depicted in FIG. 4.

EXAMPLE 3

Third Preparation of 90:10 Cl—TiOPc:TiOFPc

Figure 5:
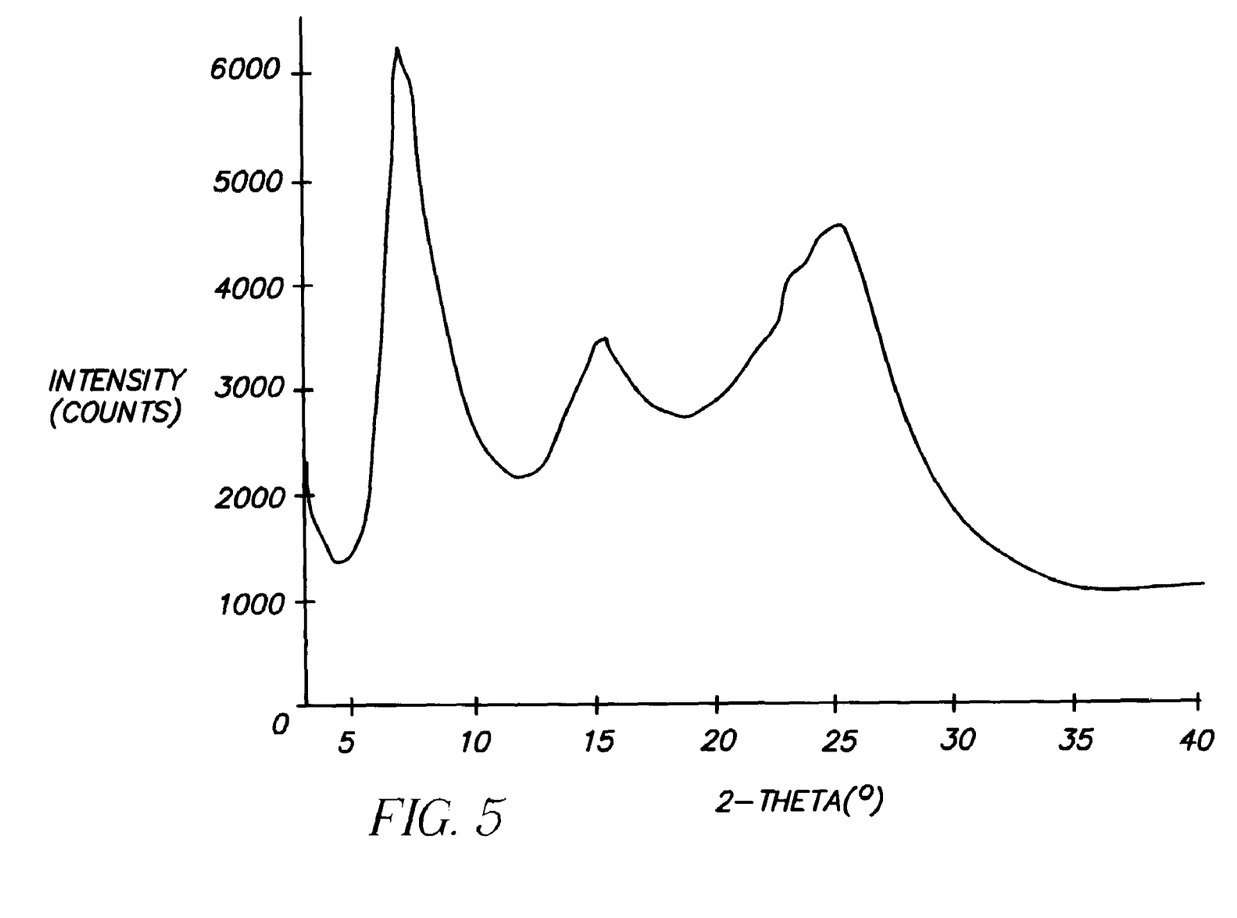
FIG. 5 shows an amorphous 90:10 Cl—TiOPc:TiOFPc composition of Example 3.

The procedure of Example 1 was followed, except that the TiOPc made by Preparation 5 and having a chlorine content of 1.5 wt % was used. The X-ray diffraction of the resulting intermediate amorphous pigment is shown in FIG. 5.

EXAMPLE 4

Preparation of 98:2 Cl—TiOPc:TiOFPc

Figure 6:
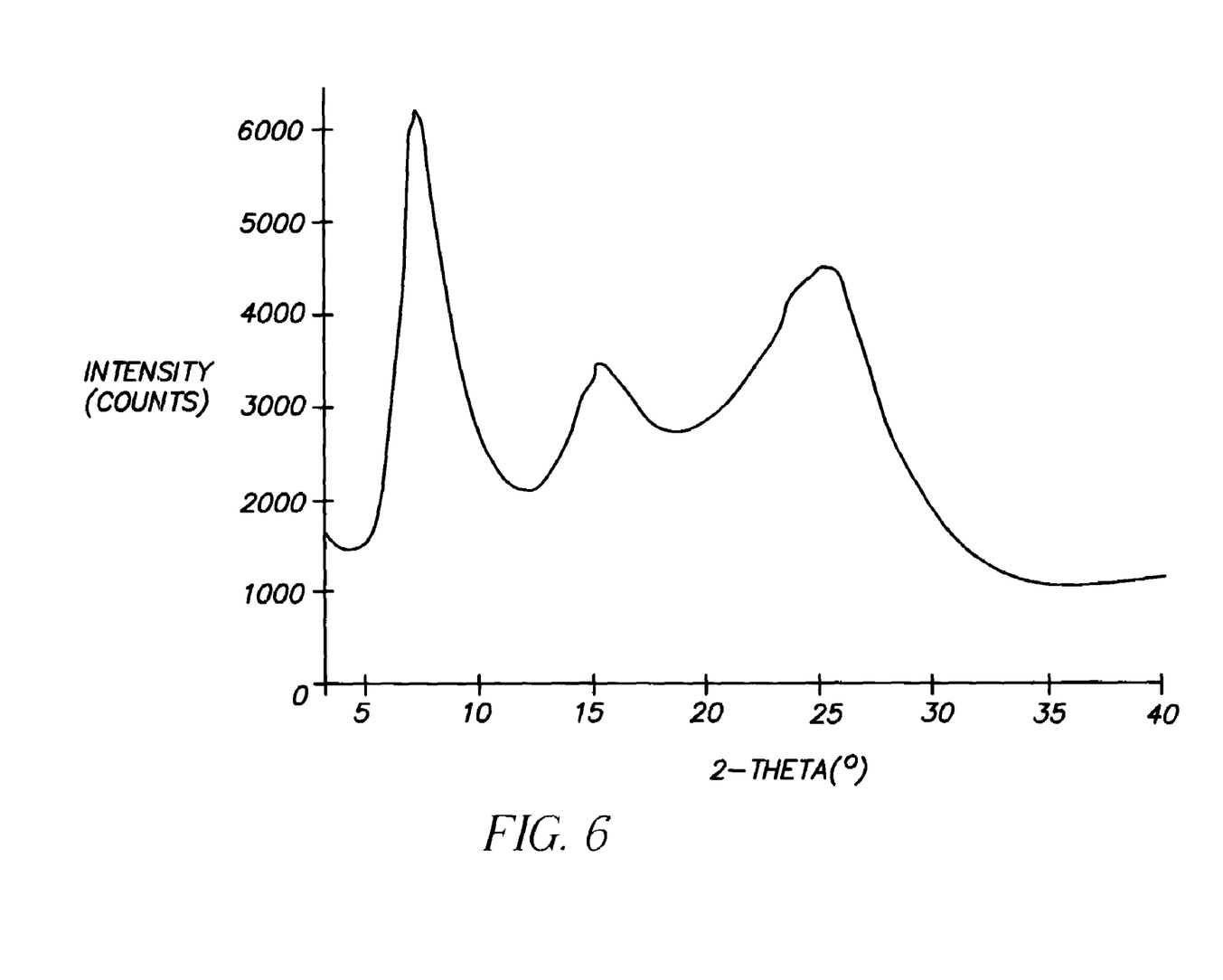
FIG. 6 shows an amorphous 98:2 Cl—TiOPc:TiOFPc composition of Example 4.

A 1-gallon-wide mouth glass jar was charged with 9 kg of 3 mm stainless steel balls, 73.5 g of Cl—TiOPc made by preparation 5 and having a chlorine content of 1.5 wt. %, and 1.5 grams TiOFPc made by preparation 2. The jar was put on a roller mill at 85 rpm, and milling was carried out for 120 hours, at which time a small sample was removed and treated in water as described in Comparative Example 1. The water-treated sample was dried and sent for x-ray analysis. The resulting spectrum, depicted in FIG. 6, shows that the inclusion of only a small amount of chlorinated pigment results in a fully amorphized pigment.

To the bulk of the sample in the jar was added 1500 ml of dichloromethane. The mixture was further milled for 24 hours, and the beads were separated from the dichloromethane pigment slurry. The pigment was collected by filtration, dried, and subjected to X-ray analysis. The resulting spectrum showed a typical pattern for a cocrystalline TiOPc/TiOFPc mixture, similar to that depicted in FIG. 3.

The invention has been described in detail for the purpose of illustration, but it is understood that such detail is solely for that purpose, and variations can be made therein by those skilled in the art without departing from the spirit and scope of the invention, which is defined by the following claims.

What is claimed is:

1. A process for forming an amorphous TiOPc/TiOFPc pigment mixture containing a low concentration of TiOFPc, said process comprising:
    subjecting a mixture comprising phthalonitrile and titanium tetrachloride to reaction conditions effective to form lightly chlorine-substituted crude crystalline Cl—TiOPc;
    combining said lightly chlorine-substituted crude crystalline Cl—TiOPc with crude crystalline TiOFPc in a weight ratio from about 70:30 Cl—TiOPc:TiOFPc to about 99.5:0.5 Cl—TiOPc:TiOFPC to form a crude crystalline pigment mixture; and
    treating said crude crystalline pigment mixture under conditions effective to form a substantially amorphous pigment mixture of Cl—TiOPc and TiOFPc.

2. The process of claim 1 wherein said weight ratio is from about 90:10 Cl—TiOPc:TiOFPc to about 98:2 Cl—TiOPc:TiOFPC.

3. The process of claim 1 wherein said Cl—TiOPc contains about 0.5 wt. % to about 2.0 wt. % chlorine.

4. The process of claim 3 wherein said Cl—TiOPc contains about 0.8 wt. % to about 1.5 wt. % chlorine.

5. The process of claim 1 wherein said reaction conditions comprise varying the molar ratio of titanium tetrachloride to phthalonitrile.

6. The process of claim 5 wherein said molar ratio of titanium tetrachloride to phthalonitrile is about 0.25:1 to about 1:1.

7. The process of claim 6 wherein said molar ratio of titanium tetrachloride to phthalonitrile is about 0.25:1 to about 0.5:1.

8. The process of claim 1 wherein said reaction conditions comprise heating said mixture to a temperature of about 150° C. to about 250° C.

9. The process of claim 8 wherein said reaction conditions comprise heating said mixture to a temperature of about 195° C. to about 215° C.

10. The process of claim 1 wherein said mixture comprising phthalonitrile and titanium tetrachloride further comprises an organic solvent.

11. The process of claim 10 wherein said organic solvent, is a chlorinated organic solvent.

12. The process of claim 11 wherein said chlorinated organic solvent is 1-chloronaphthalene.

13. The process of claim 1 wherein said conditions effective to form said substantially amorphous pigment mixture comprises dry milling.

14. The process of claim 13 wherein said dry milling is carried out using a roll mill or a ball mill.

15. The process of claim 14 wherein said dry milling is carried out using a particulate milling aid.

16. The process of claim 15 wherein said particulate milling aid comprises steel beads.

17. A process for forming a nanoparticulate cocrystalline TiOPc/TiOFPc pigment composition containing a low concentration of TiOFPc, said process comprising:
    subjecting a mixture comprising phthalonitrile and titanium tetrachloride to reaction conditions effective to form lightly chlorine-substituted crude crystalline Cl—TiOPc;
    combining said lightly chlorine-substituted crude crystalline Cl—TiOPc with crude crystalline TiOFPc in a weight ratio from about 70:30 Cl—TiOPc:TiOFPc to about 99.5:0.5 Cl—TiOPc:TiOFPC to form a crude crystalline pigment mixture;
    treating said crude crystalline pigment mixture under conditions effective to form a substantially amorphous pigment mixture of Cl—TiOPc and TiOFPc;
    forming a slurry in an organic solvent of said substantially amorphous pigment mixture of Cl—TiOPc and TiOFPc; and
    wet milling said slurry, thereby forming a nanoparticulate cocrystalline composition containing a low concentration of TiOFPc.

18. The process of claim 17 wherein said organic solvent is dichloromethane.

19. The process of claim 17 wherein said wet milling is carried out using a particulate milling aid.

20. The process of claim 19 wherein said particulate milling aid comprises steel beads.

21. The process of claim 17 wherein said nanoparticulate cocrystalline composition contains Cl—TiOPc and TiOFPc in a weight ratio of from about 90:10 Cl—TiOPc:TiOFPc to about 98:2 Cl—TiOPc:TiOFPC.

22. The process of claim 17 wherein said Cl—TiOPc in said nanoparticulate cocrystalline composition contains about 0.5 wt. % to about 2.0 wt. % chlorine.

23. An electrophotographic element that includes a charge generation layer comprising a nanoparticulate cocrystalline TiOPc/TiOFPc pigment composition formed by the process of claim 17.

* * * * *